(No Model.)

E. THOMSON.
ALTERNATING CURRENT ELECTRIC MOTOR.

No. 516,849. Patented Mar. 20, 1894.

WITNESSES
A. F. Macdonald.
T. J. Johnston.

INVENTOR
Elihu Thomson
by Bentley and Blodgett
Attys.

THE NATIONAL LITHOGRAPHING COMPANY,
WASHINGTON, D. C.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ALTERNATING-CURRENT ELECTRIC MOTOR.

SPECIFICATION forming part of Letters Patent No. 516,849, dated March 20, 1894.

Application filed June 17, 1893. Serial No. 477,916. (No model.)

*To all whom it may concern:*

Be it known that I, ELIHU THOMSON, a citizen of the United States, residing at Swampscott, in the county of Essex and State of Massachusetts, have invented a certain new and useful Improvement in Alternating-Current Electric Motors, of which the following is a specification.

My invention relates to an electric motor designed to run by alternating currents, and is an improvement in that type of motors invented by me and described in United States Patents Nos. 363,185 and 363,186, known commonly as the inductive motor, or transformer motor. Such motors have as their source of energy an alternating current coil connected to line and an armature within the influence of such coil having windings which are in closed circuit, and are single phase motors not using two phases of alternating current for their operation.

My present invention consists in the improvement of making the relation between the number of inducing or field poles and the number of coils upon the revolving armature subjected to induction an odd one; for example, when the field poles are two in number, there are three coils or a number of coils which is prime and not divisible exactly by the number of field poles. Where four poles are used the number may be three, five, seven, nine, &c., the object of this arrangement being to secure smoothness of action. The coils themselves are kept on closed circuit during normal running, that is their terminals are connected in closed circuits, either individually or collectively, and no commutator is used, the closure of their circuits being maintained during the whole revolution. A commutator may, however, be used for starting in accordance with the principles of my invention described in United States Patent No. 363,185, and may be short-circuited or have its segments connected into practically one conductor when under full speed or work.

Figure 1:
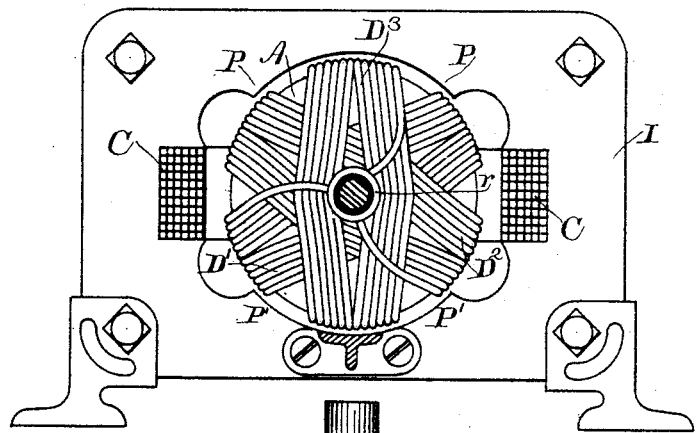
Figure 2:
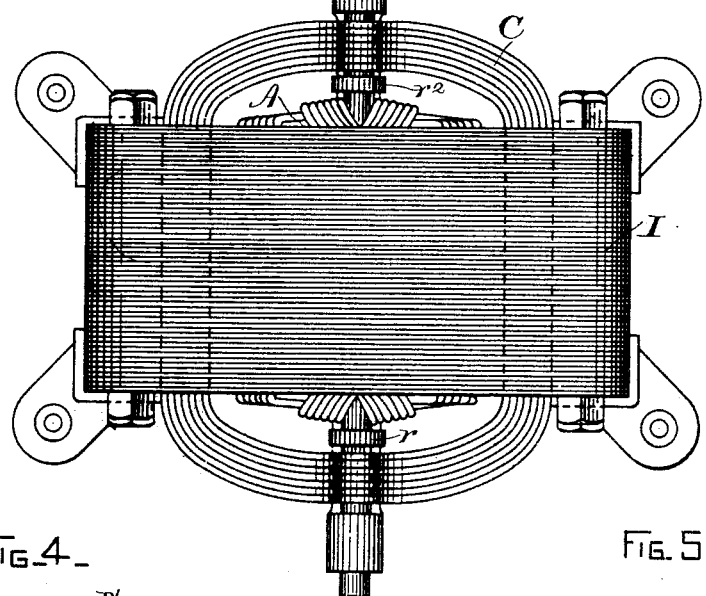
Figure 4:
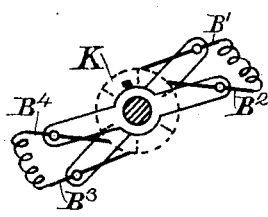
Figure 3:
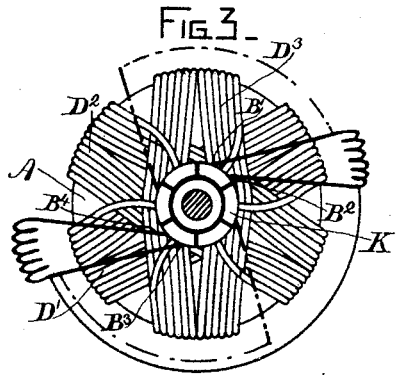
Figure 5:
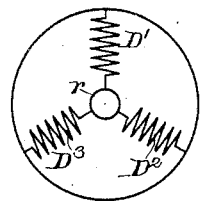

Figures 1 and 2 show in elevation and plan a motor containing the elements of my invention. Figs. 3, 4 and 5 show details.

In Fig. 1, I indicates a laminated iron frame, the laminations of which are seen on edge in Fig. 2. These may be a series of iron punchings bolted together and suitably mounted. The center portion of the laminations or field iron is punched out for the reception of an armature A, and spaces or notches are made for the reception of the field magnet coils C, C, which preferably surround the armature, or lie adjacent thereto. In motors having more than two poles the arrangement would be modified as in ordinary multipolar dynamos or motors.

The polar portions of the field-magnet are indicated at P P', and are arced in form, so as to closely approximate to the armature A, the core of which is made of a set of laminated disks, and may be of the smooth type or formed with projections between the coils. In either case it is wound with coils which, in the two pole structure shown, preferably pass over the ends of the armature and have different angular positions; all the coils are connected on closed circuit. In this case three are shown crossing each other at angles of sixty degrees, and the connection of the coils on closed circuit is indicated in Fig. 5, three ends at one end of the armature being connected to a ring $r$, and the other three ends at the other end of the armature being connected to a ring $r^2$. The armature coils $D'$, $D^2$, $D^3$ are thus maintained short-circuited. The number of coils might equally well be five or seven; it will be seen that by this arrangement there is at all times a coil in active position under the field-magnet poles P P'. With more than two field-magnet poles P P', as when the number of coils on the armature is, say, three, five, seven, nine, &c., it will be evident that the same condition is maintained, and that there are no "dead points," or positions at which the coils on the armature match the positions of the coils on the field. If an alternating current be passed through the field-magnet coils C, C, and the armature A of the machine be in place, no rotation will take place; but after an initial rotation has been imparted in either direction to the armature it will increase in speed to a certain rate which may be called the normal speed. The addition of a load or the taking of power from the shaft will now cause a reduction of speed with an increase of torque or driving force so that the motor will tend to remain at a speed approximating normal and deliver power derived inductively from the action of the currents in the field-magnet coils. This principle has already been laid down in my patents before referred to; and my present invention relates to a particular improvement, which consists in making the number of armature coils a prime number, not divisible by the number of field poles, so as to give a smooth action. Such a motor may be constructed by providing a commutator, (as in my Patent No. 363,185,) whereby the coils on the armature are kept during starting on short-circuit for a portion only of the revolution, and whereby the angle of short-circuiting may be gradually increased until it includes the whole circle of three hundred and sixty degrees. Such an arrangement is shown in Fig. 3, the commutator K having six sections, opposite sections being connected to each terminal of a coil, $D'$, $D^2$, $D^3$, respectively, as indicated in the figure. This forms an ordinary three-coil winding with idle segments between the active segments of the commutator. Brushes $B'$, $B^2$, $B^3$, $B^4$ bear on the segments, and are connected together, that is $B'$ to $B^2$, $B^2$ to $B^3$, $B^3$ to $B^4$, making a short-circuiting connection, and they are arranged to maintain the coils on the armature successively upon short-circuit for from sixty degrees to eighty degrees of revolution, or from the time just after they have passed, during revolution, a position of parallelism with the field-magnet inducing coils C C, until they have just passed the position where their planes are at right angles to that of the coils C C. This, in accordance with my prior patents referred to, will cause rotation; when the arrangements are such as have been described the motor will start to rotate with considerable torque and will gradually increase its speed. If during this increase of speed the forward brush $B'$ or $B^3$ of each pair be moved away from its companion $B^2$ or $B^4$, the period of short-circuiting or the period of maintenance of short-circuiting of the coils may be extended to cover a much larger angle and may be made to cover one hundred and twenty degrees of revolution when the brushes of each set are separated a distance of sixty degrees. If now the overlap or surface of contact with the commutator K of the brush be sufficient to cover a considerable angle, or if the segments of the commutator are spirally slotted so that the division line between them is not parallel to the axis, but is a spiral line, as commonly practiced, the angle of closed circuiting of each of the coils may be readily extended to cover one hundred and eighty degrees, which practically amounts to a short-circuit kept up during the whole revolution; for the reason that the segment which leaves one terminal of the coil is immediately transferred to the opposite set of brushes and the short-circuiting thereby kept up during the whole revolution. If the overlap of the commutator brushes be gradually extended from the amount which was necessary for starting the motor to such an amount as will keep the coils of the armature at all times completely closed, as though their ends were soldered together, I will have substantially the conditions represented; and the motor, having been started automatically, will run as an induction motor, that is, with its coils on closed circuit during work or during normal running.

The brushes of the commutator may be mounted in pairs on movable yokes, shown in Fig. 4; $B'$, $B^3$ on one yoke, and $B^2$, $B^4$ on another, and a flexible connection may be used to unite the various brushes, or instead thereof the brushes may be carried on their yokes without insulation and the yokes being in contact with each other at their bearing would give the short-circuit required. Such simple arrangements may be considerably modified in practice.

It will be understood that the principles on which my invention is founded may apply without substantial change to other methods of starting than the commutation of the armature coils, as described, and may apply to motors in which the winding of the field gives more than two poles, as when four, six, or eight pole windings are used. It will also be understood that my invention is applicable to different rates of alternations of the current supplied to the field-magnet coils, but comparatively low alternations will be in general more efficient.

Having thus described my invention, what I claim as new, and wish to protect by Letters Patent in the United States, is—

1. The method of operating an induction motor for alternating currents, which consists in partly closing the armature coils as local circuits at starting and subsequently wholly short circuiting said armature coils.

2. The method of operating an induction motor for alternating currents, which consists in partially short circuiting the armature coils at starting and gradually increasing the short circuiting as the motor takes speed.

3. The method of operating an alternating current induction motor which consists in closing a portion only of the armature conductors at starting and in subsequently completely closing and maintaining closed the armature windings or circuits.

4. The method of operating an induction motor for alternating currents, which consists in short circuiting the armature coils for given periods during revolution at starting and gradually increasing the period of short circuiting until the coils are wholly short circuited.

5. An induction motor in which the number of armature coils is prime to the number of inducing poles, the said coils being continuously short-circuited under load and at speed, substantially as herein described.

6. In an induction motor comprising inducing field magnet coils and an armature carrying induced coils, a commutator connected to such induced coils and brushes bearing upon such commutator adapted to short-circuit the armature conductors during part of a revolution when starting and to maintain the short circuit during the entire revolution when running at normal speed.

7. An induction motor comprising inducing field magnet coils and an armature carrying induced conductors the number of which is prime to that of the field-magnet poles, a commutator connected to such induced coils and brushes bearing upon such commutator adapted to short-circuit the armature conductors during part of a revolution when starting and to maintain the short-circuit during the entire revolution when running at normal speed.

In witness whereof I have hereunto set my hand this 15th day of June, 1893.

ELIHU THOMSON.

Witnesses:
JOHN W. GIBBONEY,
BENJAMIN B. HULL.